(12) United States Patent
Vela

(10) Patent No.: US 10,890,204 B1
(45) Date of Patent: Jan. 12, 2021

(54) UNIVERSAL LOCKING PIN

(71) Applicant: Richard Vela, San Fernando, CA (US)

(72) Inventor: Richard Vela, San Fernando, CA (US)

( * ) Notice: Subject to any disclaimer, the term of this patent is extended or adjusted under 35 U.S.C. 154(b) by 0 days.

(21) Appl. No.: 17/033,238

(22) Filed: Sep. 25, 2020

(51) Int. Cl.
| | | |
|---|---|---|
| *F16B 21/00* | (2006.01) | |
| *F16B 19/00* | (2006.01) | |
| *F16B 21/12* | (2006.01) | |
| *F16M 13/02* | (2006.01) | |
| *F16B 21/02* | (2006.01) | |
| *B62D 63/08* | (2006.01) | |
| *F16B 19/02* | (2006.01) | |
| *F16B 21/16* | (2006.01) | |
| *F16B 21/09* | (2006.01) | |

(52) U.S. Cl.
CPC .............. *F16B 21/12* (2013.01); *F16B 21/02* (2013.01); *F16M 13/02* (2013.01); *B62D 63/08* (2013.01); *F16B 19/02* (2013.01); *F16B 21/09* (2013.01); *F16B 21/16* (2013.01); *Y10S 411/918* (2013.01)

(58) Field of Classification Search
CPC .......... F16B 21/12; F16B 21/02; F16B 21/16; F16B 21/09; F16B 21/125; F16B 19/02; F16M 13/02; B62D 63/08
See application file for complete search history.

(56) References Cited

U.S. PATENT DOCUMENTS

| | | | | |
|---|---|---|---|---|
| 2,185,447 A * | 1/1940 | Smith | ..................... | F16B 21/12 411/344 |
| 4,102,124 A * | 7/1978 | Swager | ................... | F16G 15/06 403/154 |
| 5,437,515 A * | 8/1995 | Kuramoto | ............. | F16B 21/165 403/154 |
| 5,802,795 A * | 9/1998 | Myers | ................... | E04G 17/045 249/196 |
| 6,872,039 B2 * | 3/2005 | Baus | ..................... | F16B 21/125 411/347 |
| 2005/0220568 A1 * | 10/2005 | Fink | ........................ | F16B 21/02 411/553 |

* cited by examiner

*Primary Examiner* — Tan Le
(74) *Attorney, Agent, or Firm* — Pete Adams Law, PLLC

(57) ABSTRACT

A universal locking pin can be inserted in a through hole for connecting a wide variety of objects. Once engaged in a through hole, the universal locking pin can function as mounting point for attaching items. Materials can be mounted to the attachment hole such as rope or carabiners, cords, rings, and other materials with suitable tensile strength. The locking pin can be scaled up or down in size and constructed from a variety of materials including metal, plastic, wood, ceramic, composites, and the like.

12 Claims, 8 Drawing Sheets

UNIVERSAL LOCKING PIN

CROSS-REFERENCE TO RELATED APPLICATIONS

This is a Nonprovisional Utility U.S. patent application under 37 CFR 1.53(b).

BACKGROUND OF THE INVENTION

1. Field of the Invention

The present invention relates generally to attachment of items using a through hole. More particularly, the present invention relates to a universal locking pin serving as a mounting point for attachment of items using a through hole.

2. Description of Related Art

In the field of locking pins, there are many types of pins for connecting two or more objects. For example, different locking pins can be used in gym equipment, trailer hitches, and a variety of commercial, industrial, and residential uses. However, having different locking design products for different devices requires users to purchase several noninterchangeable locking pins. There is a need in the field for a universal locking pin engaged in a through hole to create a mounting point for attaching a variety of items. A universal locking pin that can be implemented in a wide range of devices would allow manufacturers to produce larger quantities of similar designs, thereby improving economies of scale.

SUMMARY OF THE INVENTION

Systems and methods implementing a universal locking pin are disclosed herein. The universal locking pin can be inserted in a through hole for connecting a wide variety of objects. Once engaged in a through hole, the universal locking pin can function as mounting point (anchor) for attaching items. For example, the universal locking pin can be inserted into a gym rack and used as a mounting point to connect a carabiner, ring, rope, and the like. Other non-limiting examples include methods of using the universal locking pin for connecting a trailer hitch or supporting smaller items such as plants. The locking pin can be scaled up or down in size and constructed from a variety of materials including metal, plastic, wood, ceramic, composites, and the like.

These and other features and advantages will be apparent from reading of the following detailed description and review of the associated drawings. It is to be understood that both the forgoing general description and the following detailed description are explanatory and do not restrict aspects as claimed.

DETAILED DESCRIPTION OF EMBODIMENTS

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable. The terms "object" and "item" are non-limiting terms used interchangeably in this specification.

Figure 1A:
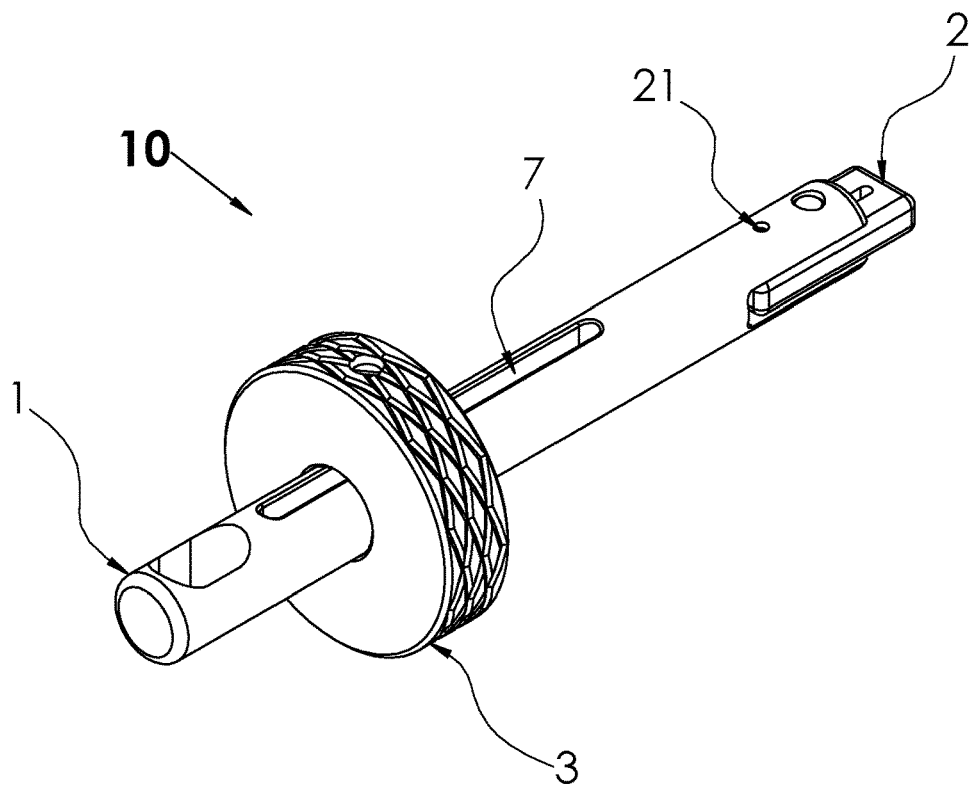
FIG. 1A illustrates a perspective view of a universal locking pin in an unlocked position.

FIG. 1A illustrates a perspective view of a universal locking pin 10 in an unlocked position. The unlocked position is used for inserting or removing the pin 10 from a through hole. The shaft 1 of the locking pin 10 is a solid shaft, cylindrical in shape, with slot and pocket features cut into the shaft 1. The universal locking pin 10 can be constructed from a variety of materials including metal, plastic, wood, ceramic, composites, and the like. A locking tab 2 is in an unlocked position, enabling the locking pin 10 to be inserted (or removed) using a through hole. A locking ring 3 is also cylindrical in shape. The locking ring 3 has a hole in the center with a diameter slightly larger than the diameter of the shaft 1. The locking ring 3 fits around the shaft 1 and can move along a slide feature slot groove 7, a cut out portion on a surface of the shaft 1.

Figure 1B:
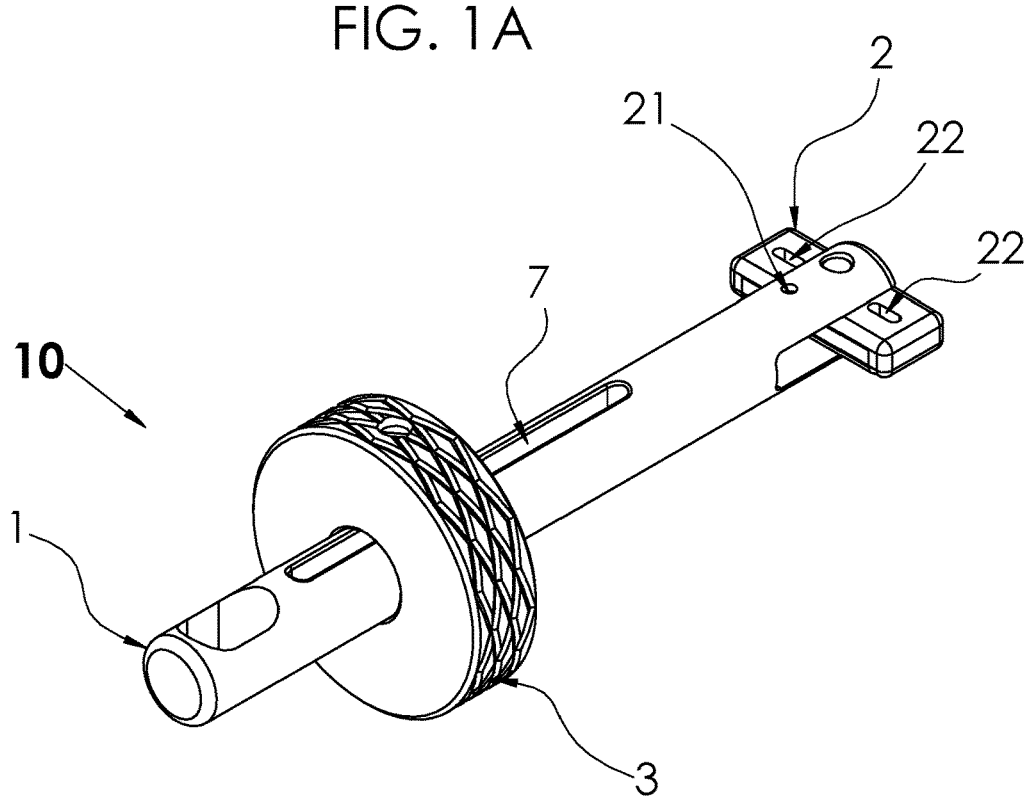
FIG. 1B illustrates a perspective view of the universal locking pin in a locked position.

FIG. 1B illustrates a perspective view of the universal locking pin 10 in a locked position. Once inserted into a through hole, the universal locking pin 10 can be engaged in a locked position after rotating the locking tab 2 approximately ninety degrees from the unlocked position shown in FIG. 1. The locking tab 2 is shown extended horizontally relative to the shaft 1.

Figure 2:
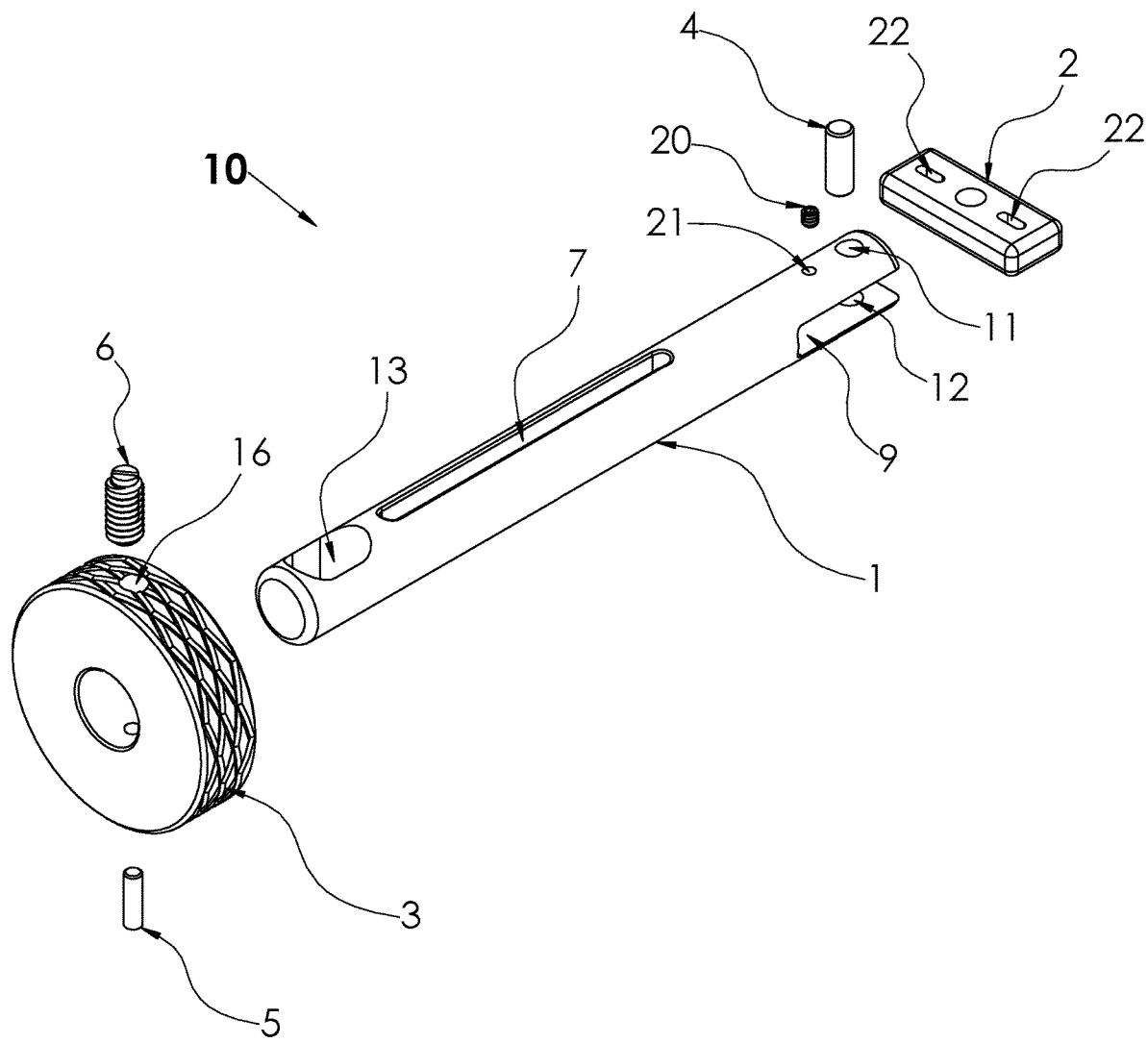
FIG. 2 illustrates an exploded perspective view of the universal locking pin.

FIG. 2 illustrates an exploded perspective view of the universal locking pin 10. The locking ring 3 includes a slide pin 5 and a locking spring loaded mechanism 6. The slide pin 5 enables the locking ring 3 to move along the slot groove 7. The slide pin 5 can simultaneously move along the top slot groove 7 and the bottom slot groove 17. The spring loaded mechanism 6 has an external threaded body enabling it to fit into a threaded hole 16. The spring loaded mechanism 6 further includes an internal spring with a nylon ball at an end. When the locking ring 3 is rotated to a locked position, the nylon ball compresses against the outer surface of the shaft 1 to create tension and friction. When the spring loaded mechanism 6 is compressed against the shaft 1, the locking ring 3 is fixed (locked) in place and cannot move. When the locking ring 3 is fixed in place, the amount of force needed to move or rotate the locking ring 3 is determined by the amount of compression applied by the nylon ball. The tension/compression of the spring loaded mechanism 6 can be adjusted by the depth that the mechanism 6 is fastened into the locking ring 3. The tension/compression is increased by fastening the spring loaded mechanism 6 deeper (greater depth) into the locking ring 3. Conversely, the tension/compression is reduced by decreasing the depth of the spring loaded mechanism 6 within the locking ring 3. The tension/compression of the spring loaded mechanism 6 can be adjusted during assembly of the universal locking pin 10 or adjusted later by disassembling components of the pin 10. With cross reference to FIG. 3B, when the locking ring 3 is rotated, the spring loaded mechanism 6 compresses against the outer surface of the shaft 1 and secures the locking ring 3 in a fixed position on the shaft 1. Simultaneously, the slide pin 5 rotates from the slot groove 17 into a lock groove 18 on the bottom side of the shaft 1.

The shaft 1 has a cut out portion 9 on an end with a top hole 11 and a bottom hole 12. The locking tab 2 includes a hole 8 for inserting a dowel pin 4. The dowel pin 4 connects the locking tab 2 to the shaft 1 by inserting the dowel pin 4 through the top hole 11, locking tab hole 8, and bottom hole 12. The locking tab 2 further includes a plurality of slots (one or more) 22. With cross reference to FIG. 1A, which shows the locking pin 10 in an unlocked position for insertion (or removal), the dowel pin 4 and locking tab 2 are kept in line with the shaft 1 using a locking set screw 20 and the plurality of slots 22. The locking set screw 20 is threaded into the shaft 1 using a small threaded hole 21 (which can be a tapped hole). In the unlocked position, the locking set screw 20 (shown extracted in FIG. 2) can engage a slot 22 preventing side to side movement of the locking tab 2. The locking tab 2 can be rotated perpendicular to the shaft 1 to secure the universal locking pin 10 in place, with the locking tab 2 acting as an anchor point.

Figure 3A:
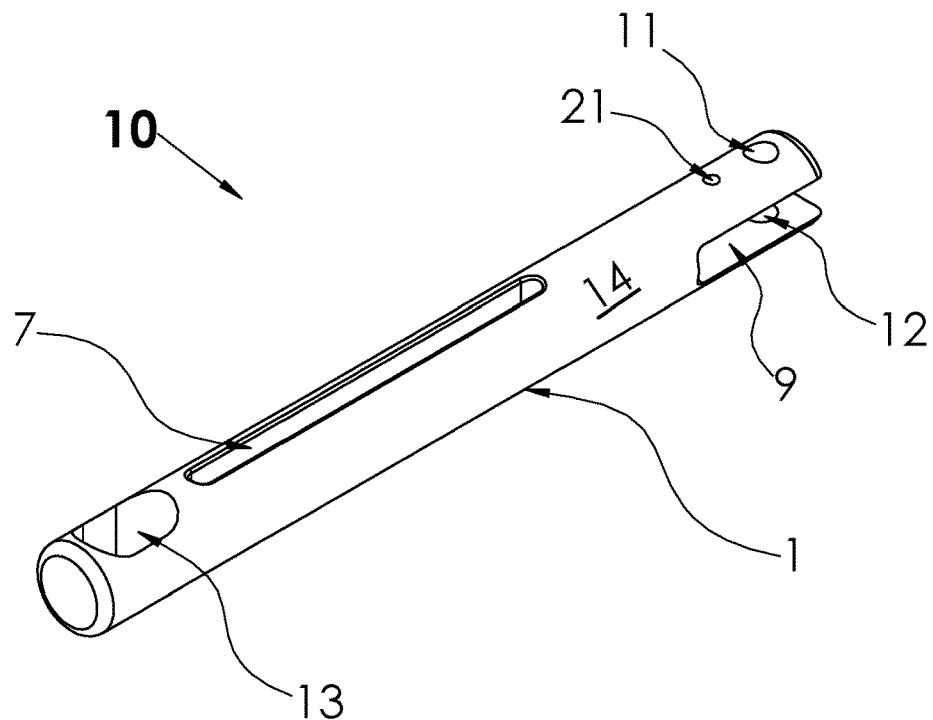
FIG. 3A illustrates a perspective top view of the shaft of the universal locking pin.

FIG. 3A illustrates a perspective top view of the shaft 1 of the universal locking pin 10. The attachment hole 13 can be used as a mounting point (anchor) enabling a user to attach items. On the top surface 14 of the shaft 1, the top slot groove 7 functions as a slide feature enabling the locking ring 3 to move along the shaft 1.

Figure 3B:
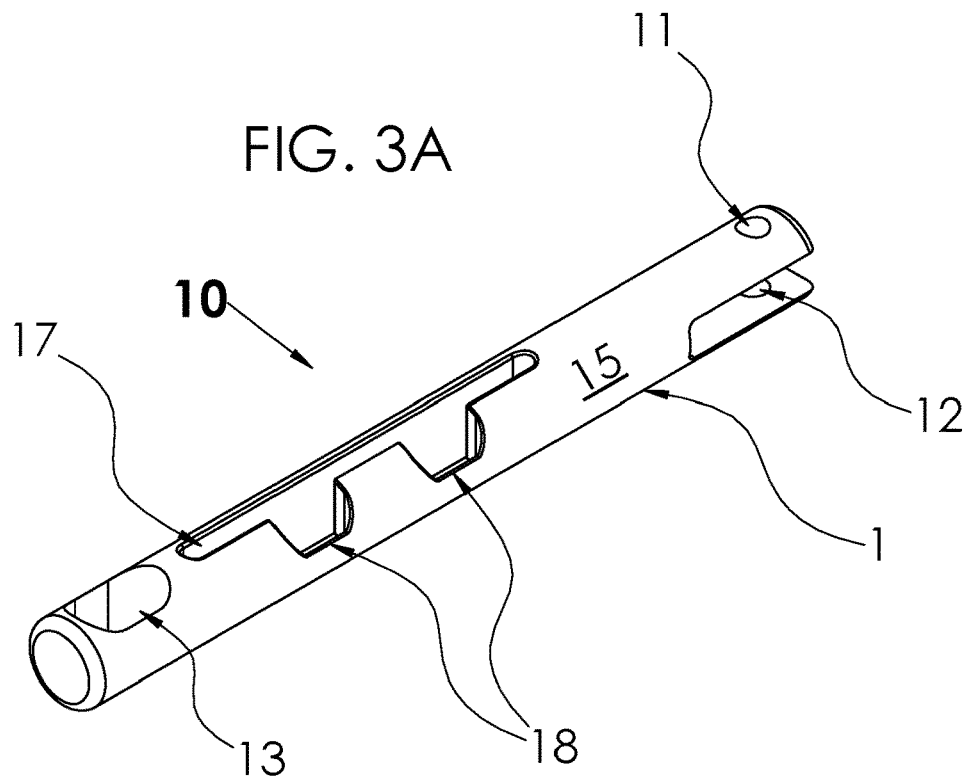
FIG. 3B illustrates a perspective bottom view of the shaft of the universal locking pin.

FIG. 3B illustrates a perspective bottom view of the shaft 1 of the universal locking pin 10. The bottom surface 15 of the shaft 1 includes a bottom surface slot groove 17 of similar length to the top groove 7 on the top surface 14. The slide pin 5 can simultaneously move along the top slot groove 7 and the bottom slot groove 17. The bottom surface 15 also includes a plurality (one or more) of lock grooves 18. In the example embodiment shown in FIG. 3B, there are two lock grooves 18 although more or less grooves 18 can be implemented. A user can slide the locking ring 3 forward or backward, then rotate the ring 3 to secure it 3 in any of the lock grooves 18.

Figure 4:
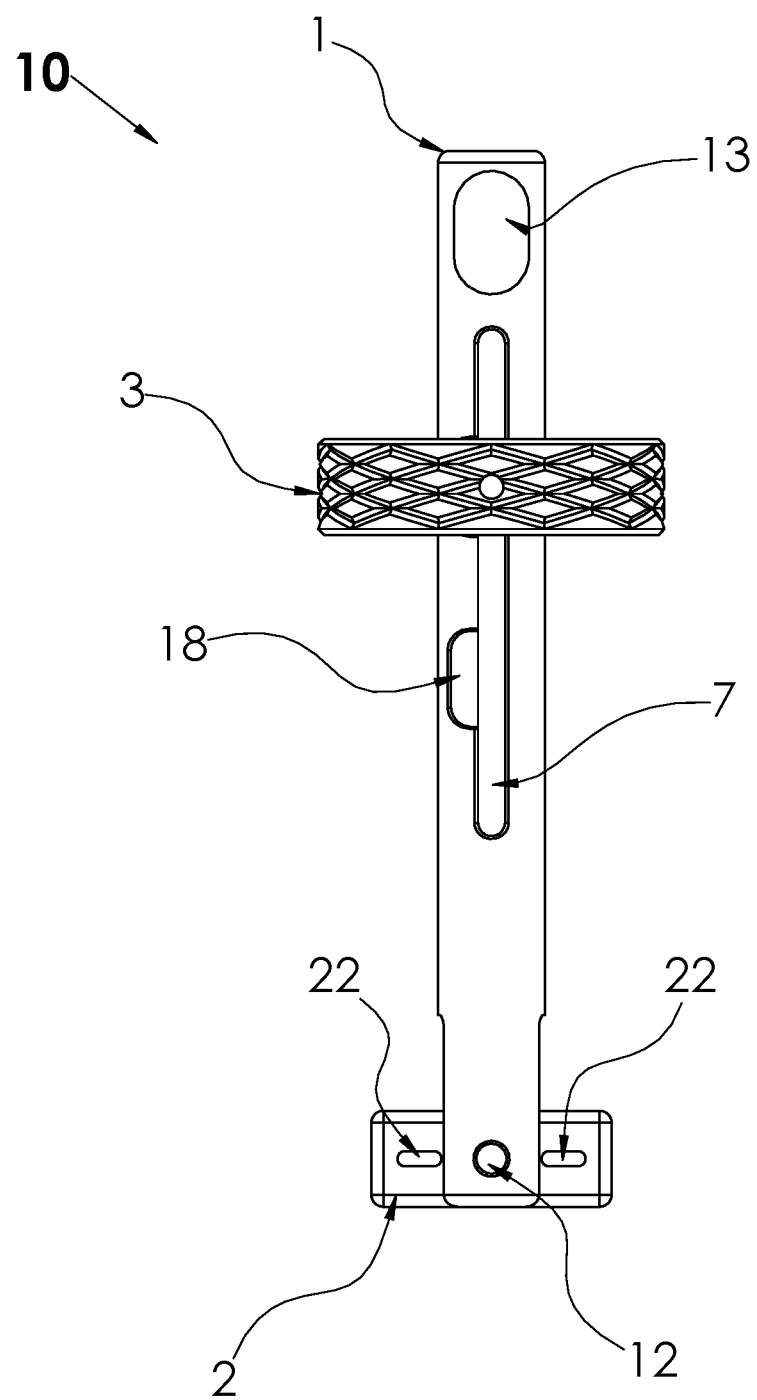
FIG. 4 illustrates a bottom view of the universal locking pin in a locked position.

FIG. 4 illustrates a bottom view of the universal locking pin 10 in a locked position. The locking ring 3 is secured in a lock groove 18 using the spring loaded mechanism 6 (shown in FIG. 2). When the spring loaded mechanism 6 is engaged with a lock groove 18, the locking tab 2 is extended horizontally relative to the shaft 1.

Figure 5:
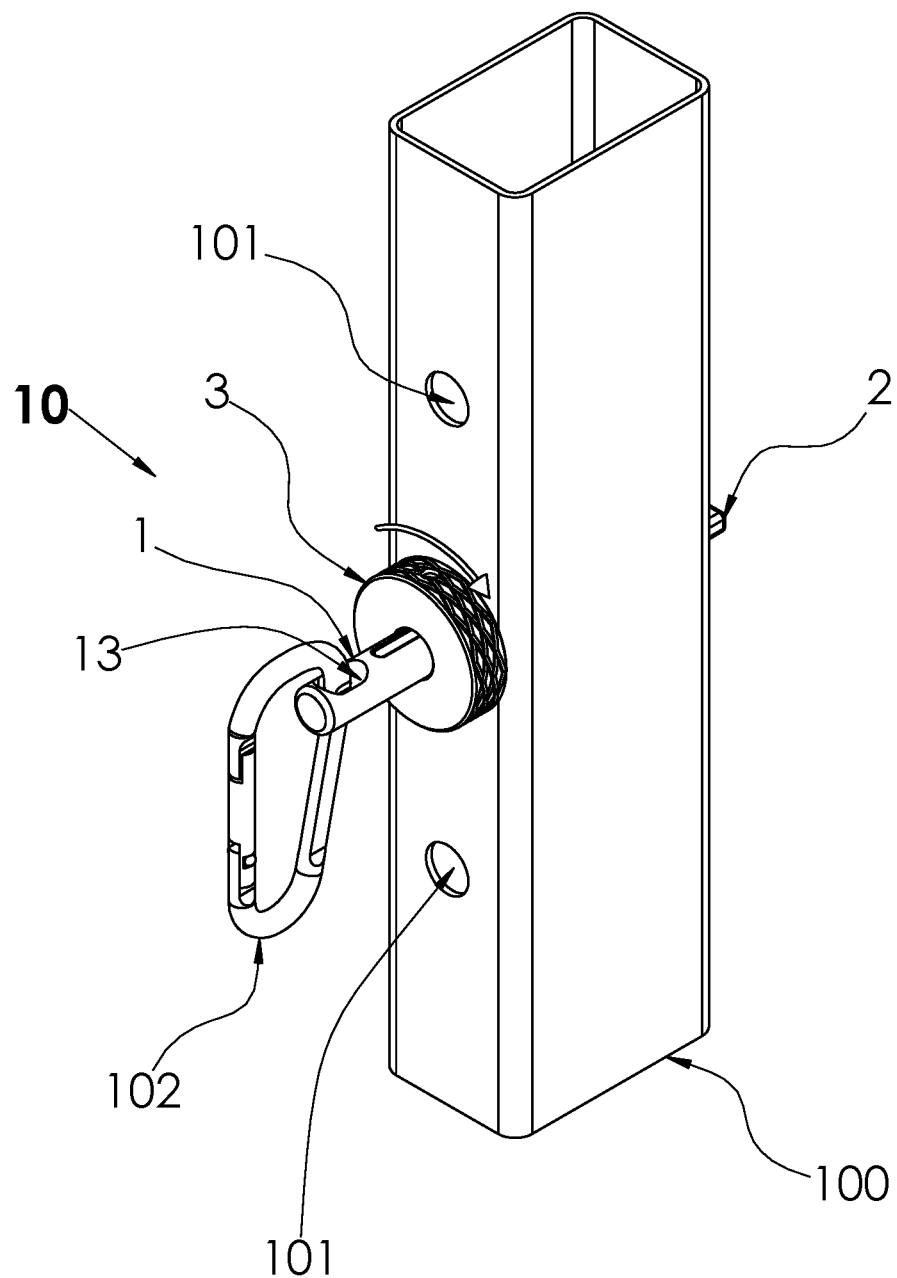
FIG. 5 illustrates a perspective view of the universal locking pin implemented in a gym equipment rack.

FIG. 5 illustrates a perspective view of the universal locking pin 10 and a method of use in a gym equipment rack 100. The universal locking pin 10 is inserted into a through hole 101 of the gym rack 100 in the unlocked position. Insert the universal locking pin through hole 101 until the locking tab 2 is cleared then swivel the locking tab 2 to the locked position. Then, a user can slide the locking ring 3 along the shaft 1 until the ring 3 is close to or contacting the gym rack 100. The user can then rotate the locking ring 3 around the shaft 1 until the slide pin 5 engages a lock groove 18. Once the locking ring 3 and locking tab 2 are rotated approximately ninety degrees, the universal locking pin 10 is in a locked position. In this example embodiment 10, the locking ring 3 is rotated clockwise toward a locked position although alternative embodiments can be designed to enable counterclockwise locking (and clockwise unlocking). To unlock the universal locking pin 10, the locking ring 3 can be rotated counterclockwise. After rotating the locking ring 3 approximately ninety degrees counterclockwise, the locking tab 2 will return to the unlocked position (FIG. 1A).

Figure 6:
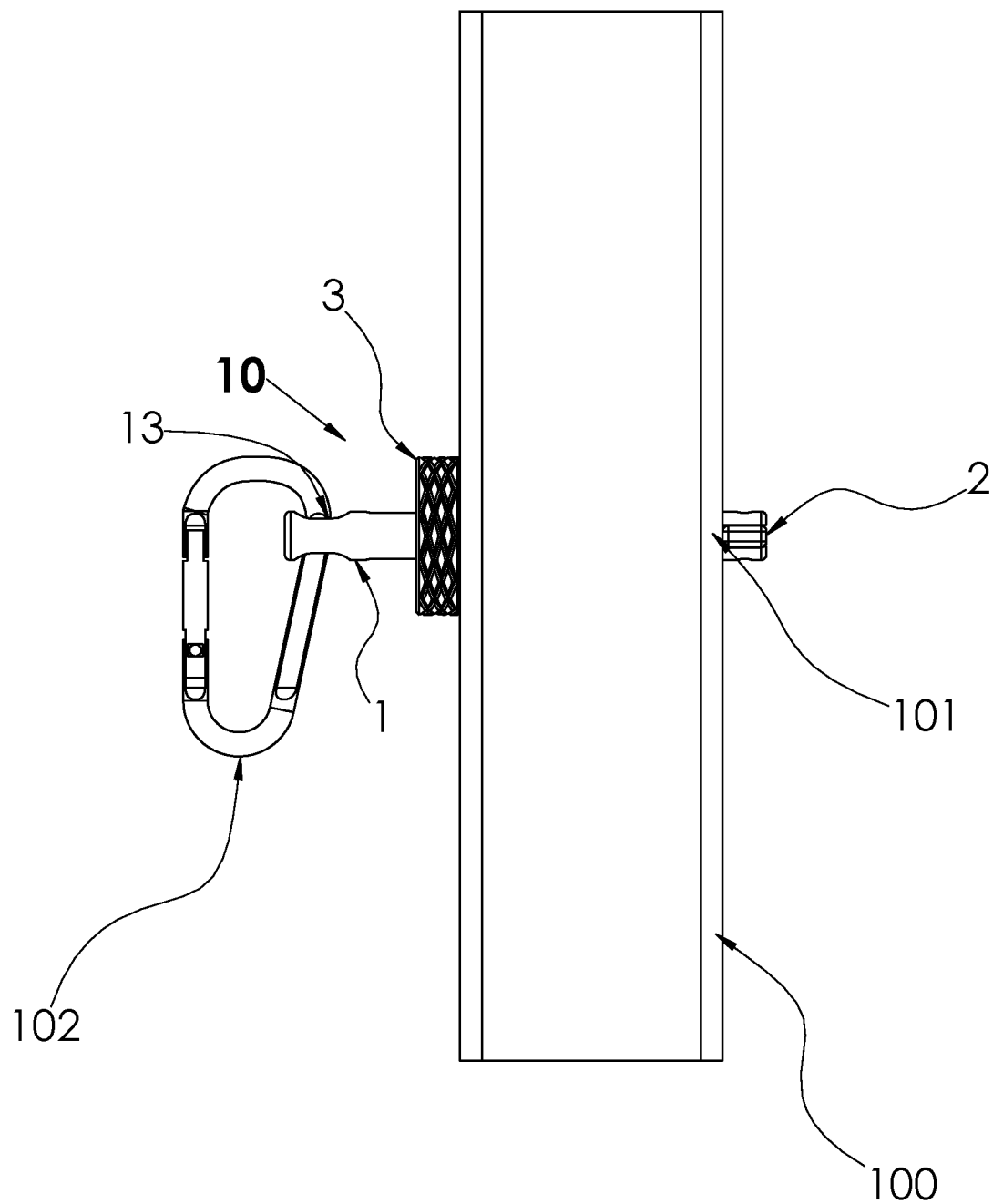
FIG. 6 illustrates a side view of the universal locking pin in a locked position and implemented in a gym equipment rack.

FIG. 6 illustrates a side view of the universal locking pin 10 in a locked position and implemented in a gym equipment rack 100. The locking ring 3 is shown flush with the surface of the gym rack 100. The locking tab 2 is extended horizontally relative to the shaft 1 and the spring loaded mechanism 6 is engaged. When the locking tab 2 is extended horizontally, the universal locking pin 10 cannot be pulled out of a through hole 101. As an example, a carabiner 102 is shown mounted to the attachment hole 13 although other items can be mounted in a similar manner. When tension is applied to a carabiner 102 or other attached items, the locking tab 2 and the spring loaded mechanism 6 prevent the universal locking pin 10 from being pulled out of the gym rack 100.

Figure 7A:
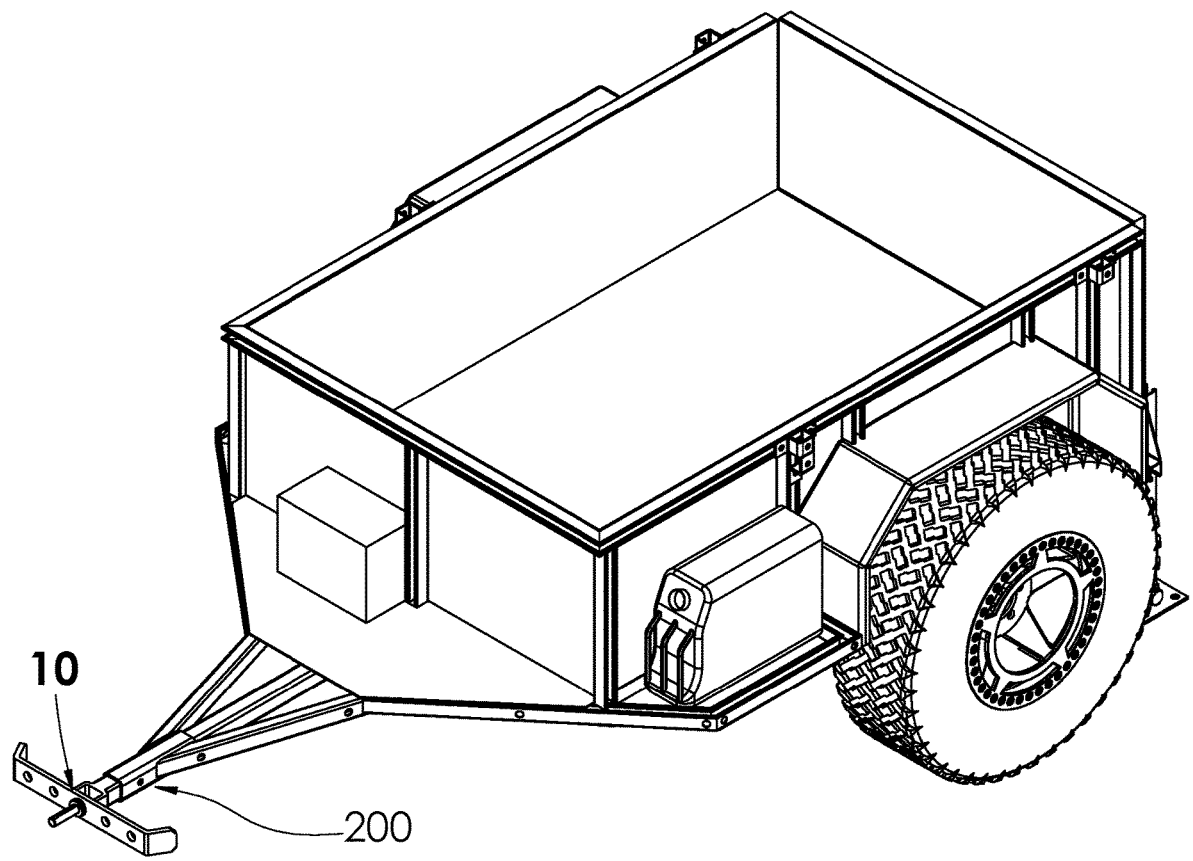
FIG. 7A illustrates a perspective view of the universal locking pin implemented in a trailer hitch connected to a trailer.
Figure 7B:
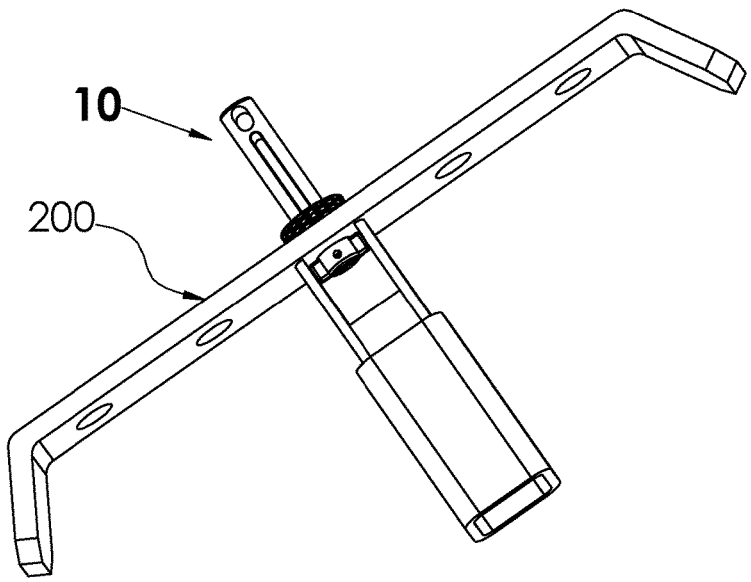
FIG. 7B illustrates a perspective close up view of the universal locking pin in the trailer hitch.

FIG. 7A illustrates a perspective view of the universal locking pin 10 and a method of use in a trailer hitch 200 connected to a trailer. FIG. 7B illustrates a perspective close up view of the universal locking pin 10 in the trailer hitch 200. There are no size limitations and the locking pin 10 can be scaled up to accommodate greater weight. For heavier load applications requiring pulling forces or static load bearing, the locking pin 10 can be constructed of strong materials such as stainless steel. Changing the size or material composition of the universal locking pin 10 does not fundamentally change its structural design or functions.

Figure 8:
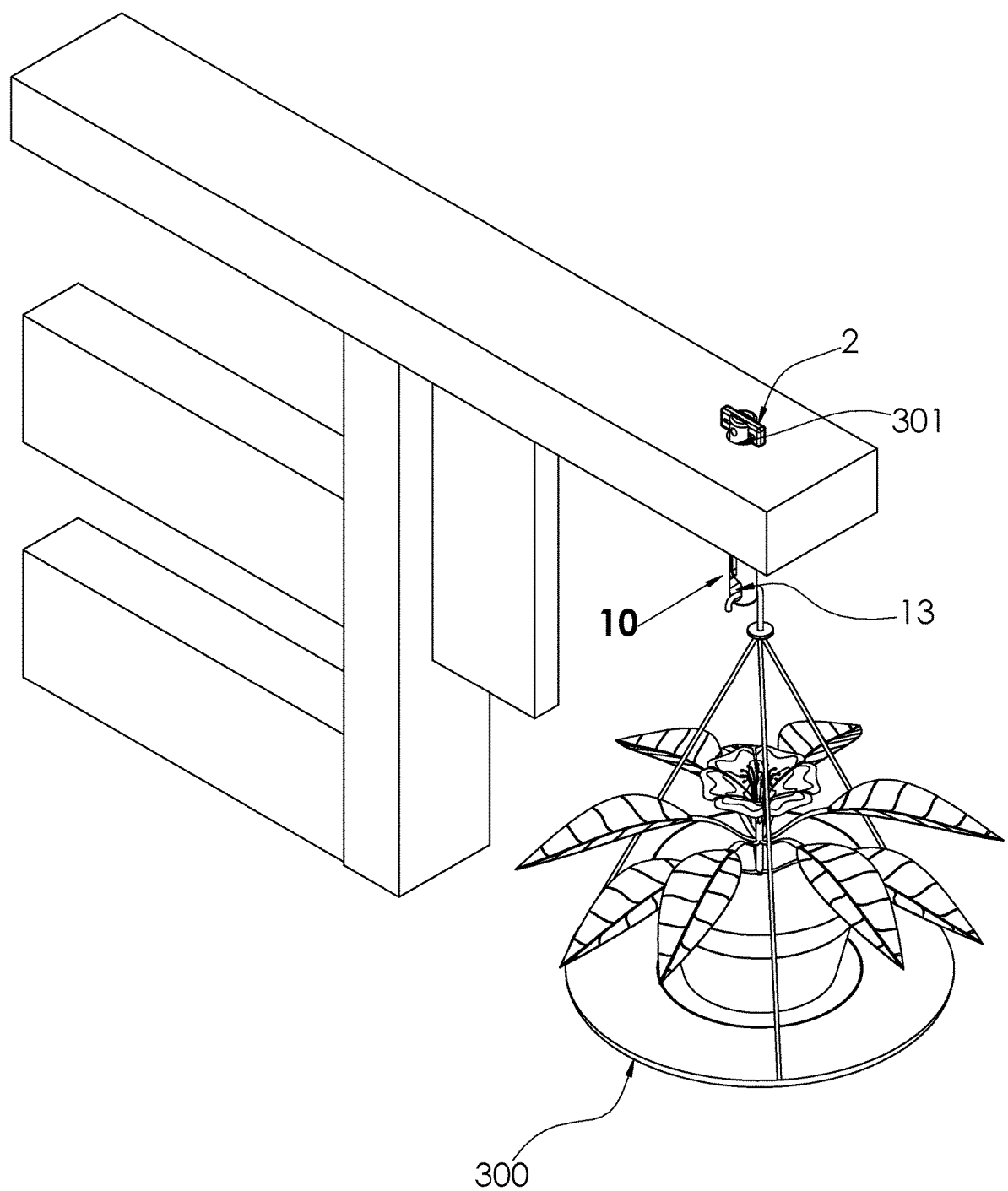
FIG. 8 illustrates a perspective view of the universal locking pin supporting a flower pot.

FIG. 8 illustrates a perspective view of the universal locking pin 10 and a method of use for supporting a flower pot 300. The locking pin 10 can be scaled down in size to fit in a smaller through hole 301. The locking pin 10 can be constructed of lightweight material such as plastic. In this example, the locking pin 10 is inserted into a through hole 301 of a wooden structure 302. Rope 303 for supporting a flower pot can be mounted to the attachment hole 13. Materials besides rope and carabiners can be mounted to the attachment hole 13 including cords, rings, and other materials with suitable tensile strength. When tension is applied to the universal locking pin 10 through gravity or other means, the locking tab 2 and the spring loaded mechanism 6 prevent the locking pin 10 from being pulled out of the wooden through hole 301.

The invention claimed is:

1. A universal locking pin apparatus comprising:
   a. a shaft comprising:
      i. an attachment hole;
      ii. a top surface;
      iii. a bottom surface;
      iv. a slot groove on the top surface;
      v. a slot groove on the bottom surface;
      vi. a plurality of lock grooves on the bottom surface;
      vii. a top hole;
      viii. a bottom hole;
   b. a locking ring comprising:
      i. a slide pin;
      ii. a spring loaded mechanism;
   c. wherein the locking ring is configured to slide along the top slot groove and the bottom slot groove;
   d. a locking tab comprising a hole;
   e. a dowel pin configured to connect the locking tab to the shaft;
   f. wherein the locking ring can be locked by:
      i. rotating the locking ring around the shaft to enable the spring loaded mechanism to compress against the shaft; and
      ii. rotating the slide pin from the slot groove on the bottom surface into the plurality of lock grooves; and
   g. wherein the dowel pin can be rotated perpendicular to the shaft to secure the universal locking pin in place, the dowel pin acting as an anchor point.

2. The universal locking pin of claim 1, wherein the universal locking pin is constructed of metal.
3. The universal locking pin of claim 1, wherein the universal locking pin is constructed of steel.
4. The universal locking pin of claim 1, wherein the universal locking pin is constructed of wood.
5. The universal locking pin of claim 1, wherein the universal locking pin is constructed of plastic.
6. A method of mounting an item to a universal locking pin comprising:
   providing a universal locking pin, the universal locking pin comprising:
      a. a shaft comprising:
         i. an attachment hole;
         ii. a top surface;
         iii. a bottom surface;
         iv. a slot groove on the top surface;
         v. a slot groove on the bottom surface;
         vi. a plurality of lock grooves on the bottom surface;
         vii. a top hole;
         viii. a bottom hole;
      b. a locking ring comprising:
         i. a slide pin;
         ii. a spring loaded mechanism;
      c. a locking tab comprising a hole;
      d. a dowel pin configured to connect the locking tab to the shaft;
   inserting the universal locking pin into a through hole of an object;
   locking the locking ring by:
      a. rotating the locking ring around the shaft to enable the spring loaded mechanism to compress against the shaft;
      b. rotating the slide pin from the slot groove on the bottom surface into the plurality of lock grooves; and
   rotating the dowel pin perpendicular to the shaft to secure the universal locking pin in place, the dowel pin acting as an anchor point.

7. The method of claim 6, wherein the object comprises a gym rack.
8. The method of claim 6, wherein the object comprises a trailer hitch.
9. The method of claim 6, wherein the object comprises a wooden structure.
10. The method of claim 6 further comprising mounting an item to the attachment hole of the shaft.
11. The method of claim 10, wherein the item comprises a carabiner.
12. The method of claim 10, wherein the item comprises rope.

* * * * *